United States Patent Office 3,251,480
Patented May 17, 1966

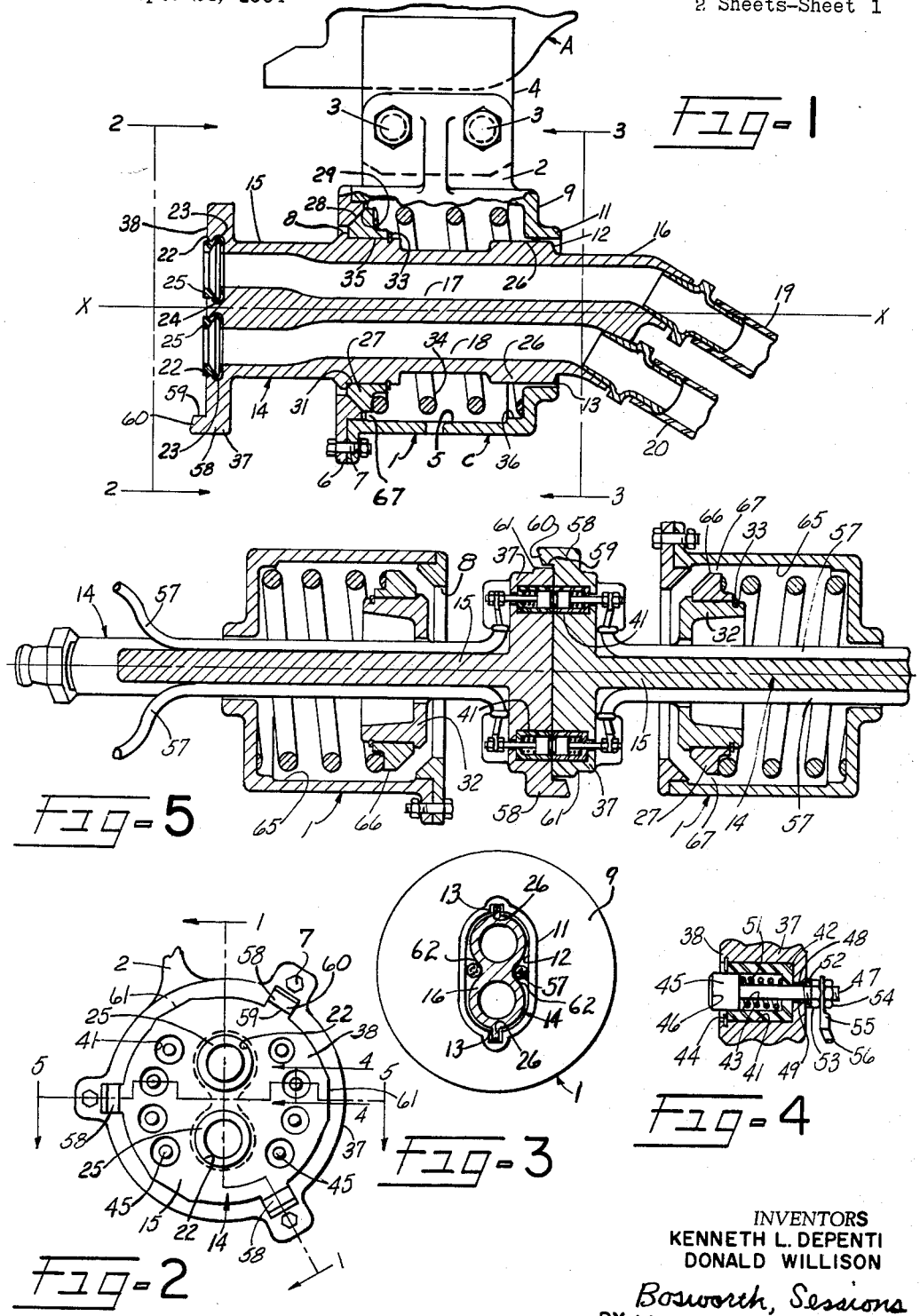

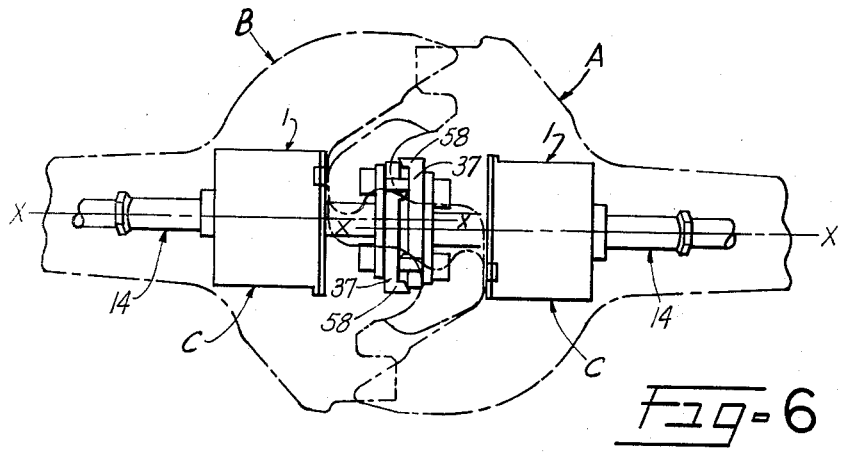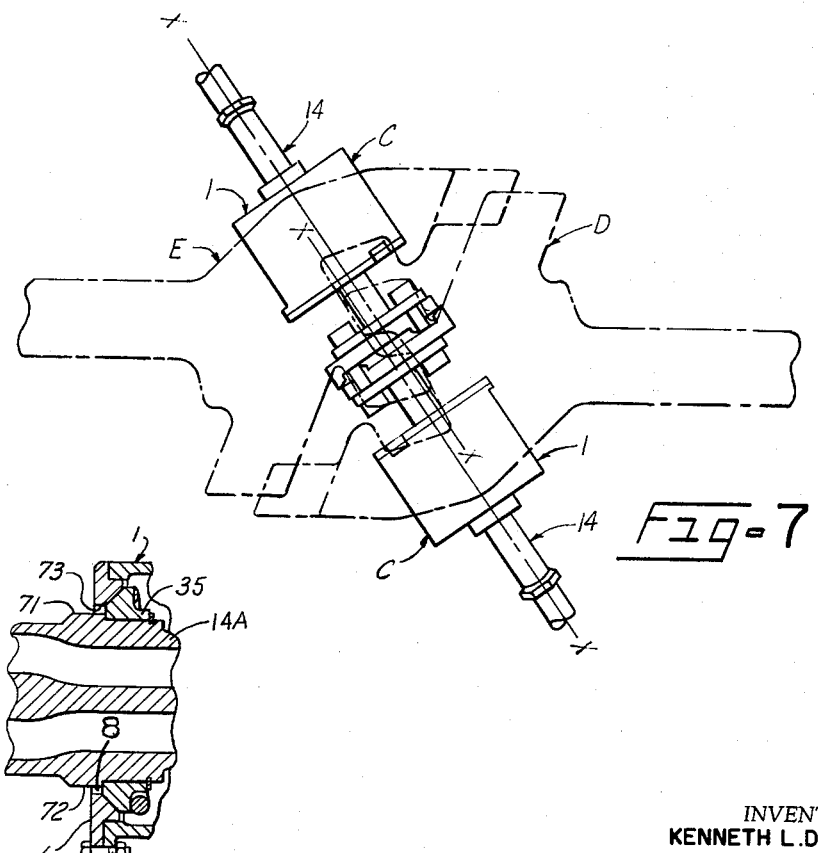

3,251,480
AUTOMATIC TRAIN LINE SERVICE CONNECTOR
Kenneth L. De Penti, Mayfield Heights, and Donald Willison, Lyndhurst, Ohio, assignors, by mesne assignments, to Midland-Ross Corporation, Cleveland, Ohio, a corporation of Ohio
Filed Sept. 24, 1964, Ser. No. 398,883
8 Claims. (Cl. 213—1.3)

This invention relates to means for connecting fluid-conducting conduits and electrical circuits between railway vehicles, and more particularly to connectors that make possible the automatic connection of fluid-conducting conduits and electrical circuits carried by railway vehicles as the couplers of such vehicles are coupled.

When railway vehicles, such as railway cars, are coupled together, it is often necessary to connect together conduits for conducting fluid such as air or steam under pressure, and electrical circuit means carried by the vehicles, in order to permit the fluid to be conducted along the train of cars for power or other purposes, and to permit electrical current to be conducted along the train for lighting, communication or other purposes. It is very desirable that the fluid-conducting conduits and the electrical means be connected together on coupling of the cars, and be disconnected on uncoupling, without the necessity of utilizing manual action with its attendant high labor costs and the possibility of hazards to personnel.

However, connectors for connecting fluid conduits and electrical circuit means of the prior art are, in general, suitable for use only on railway vehicles equipped with so called "tightlock" couplers that maintain a tight face engagement, such as the A.A.R. (Association of American Railroads) Approved Type H coupler. Such couplers are characterized by mating pocket and projection structures that hold the coupled couplers from appreciable relative movement in any direction transverse to the longitudinal pulling axes of the couplers. Such relatively expensive interlocking type couplers in general are used only in passenger type equipment. The majority of railway vehicles are freight cars, however, and of these many are equipped with couplers such as the knuckle-type A.A.R. Alternate Standard Type F interlocking coupler or the Willison fixed jaw type of coupler, both of which permit limited longitudinal, lateral including vertical, and universal angling relative movements during train operation.

The fact that the couplers are capable of such relative movements causes problems in effecting automatic connection, and maintaining connection, of fluid conduits and electrical circuits of adjacent vehicles. If the connectors connected by the fluid conduits and electrical circuits do not provide for accommodation of such relative movements of the couplers while maintaining tight connections, there will be stresses or severe wear on the connectors, or chafing and breakage of fluid seals and electrical contacts.

The connectors must also form the desired fluid-tight seals between fluid conduits and form electrical contacts between circuit elements, on the vehicles being coupled as their couplers couple, even though the couplers may move at angles to the pulling axis during their final coupling movement at the end of the coupling operation. Another requirement is that the mating connector parts properly align themselves during the final coupling movement in order to effect the desired seals between the fluid conduits and the electrical contact parts of the electrical circuit elements.

Since the only feasible location for the connector is one in which it is fixed to the coupler below the coupler, it is important that the connector be compact and be located as close to the coupler as is possible, so it will not interfere with hoses or other parts of the railway vehicles and so it will not strike parts of the track system as the vehicle moves along the track.

The connector should be rugged in construction, require little maintenance, and be capable of manufacture at reasonable cost.

In general, the prior art does not provide connecting means for effecting electrical and fluid-tight connections between adjacent railway vehicles that are coupled together by couplers capable of relative lateral, longitudinal and universal angling movements after they are coupled, which connecting means satisfies all of these requirements to the extent desired.

Accordingly, it is a primary object of this invention to provide means for automatically effecting satisfactory connections between fluid conduits and electrical circuits on cars or other railway vehicles that are coupled with couplers that in use are capable of limited relative lateral including vertical, longitudinal or angling movements.

A further object is the provision of an automatically coupling connector for railway vehicle fluid-carrying and electrical conduction lines having at least one portion capable of lateral, longitudinal and universal angling movements, so that the connector can be used with car couplers that are susceptible to such movements in use after coupling.

Another object is to provide such connectors that maintain fluid-tight seals and good electrically conductive contacts without relative movement of the connected parts of the connectors, even though there are appreciable lateral, longitudinal and angling movements of the coupled couplers.

A further object is the provision of such connectors that are compact and can be attached to existing couplers with little difficulty and little modification of the couplers.

Another object is the provision of connectors of these types which may be manufactured from cast metal with a minimum of machining, which are durable and foolproof, and which may be manufactured and sold at reasonable costs.

These and other objects of the invention will become apparent from the following description in connection with the following drawings in which:

FIGURE 1 is a longitudinal sectional elevation to a reduced scale, along line 1—1 of FIGURE 2, of a connector embodying the invention, the connector being shown as rigidly connected to and below a coupler;

FIGURE 2 is an end elevation viewed from line 2—2 of FIGURE 1;

FIGURE 3 is a sectional elevation from line 3—3 of FIGURE 1;

FIGURE 4 is a sectional detail of one of the electrical contact means, from line 4—4 of FIGURE 2 but to a larger scale;

FIGURE 5 is a sectional elevation showing two identical connectors of FIGURES 1-4 in connected relation to form sealed joints between fluid conduits and to form electrical contacts between electrical circuit means, the section being taken along each connector to correspond to line 5—5 of FIGURE 2;

FIGURE 6 is a plan elevation of two knuckle-type couplers engaged in their final coupling movement, each of the couplers being shown diagrammatically in broken lines, each of the couplers supporting below it a connector embodying the invention and shown in full lines, the couplers and connectors being shown in the positions they assume relative to each other during the final coupling movements of the couplers;

FIGURE 7 is a similar plan elevation of two fixed jaw couplers during the final coupling movement, each of these couplers being shown diagrammatically in broken lines and having fixed below it a connector embodying the invention and shown in full lines, the couplers and the connectors being shown in the positions they assume relative to each other during final coupling movements of the couplers; and FIGURE 8 shows in longitudinal section a portion of an alternative connector embodying the invention, having a modified movable member.

In FIGURE 1 a coupler A has connected to it a connector C embodying the invention. The connector C comprises a housing, generally indicated by numeral 1, that is of generally circular cross section. The housing is fixed to a bracket 2 rigidly connected by bolts 3 to a downwardly extending bracket 4 fixed to knuckle-type coupler A. Coupler A in this case is an A.A.R. Approved Type F interlocking coupler that is in use on the railroads of the United States. Housing 1 has an interior cavity 5 of generally circular cross section. At its front end, which extends in the same direction as the coupling end of the coupler A, the housing has a removable front wall member 6 that is removable demountably held in place by bolts 7. Wall member 6 has therethrough a circular opening 8 symmetrical about an axis coaxial with the interior cavity 5 of the housing. At its rear end, housing 1 has an integral rear wall 9 carrying an outwardly extending boss 11. An oblong opening 12 (FIGURE 3), symmetrical about an axis coaxial with opening 8 of the front wall, extends through rear wall 9 and its boss 11. Rear wall opening 12 has two oppositely disposed longitudinal extending keyways 13 in the ends of the opening.

A movable conduit member, generally designated by reference numeral 14, has a front portion 15 extending forwardly out of opening 8 of front wall 6 of housing 1, which opening is large enough to permit substantial, but limited, transverse movement of the front portion 15 relative to housing 1. Member 14 also has a rear portion 16 extending rearwardly out of the housing through opening 12, which is also large enough to permit limited but substantial transverse movement of member 14 relative to housing 1. Member 14 also has two passages 17 and 18 that extend through the member and have open rear ends that communicate with the interiors of flexible hoses 19 and 20 fixed in a conventional manner to the rear end of the member. These hoses are connected to a source of air or steam under pressure, as required.

At the front portion 15 of member 14, each passage 17, 18 terminates in a circular front opening 22. Each opening 22 has a radially extending circumferential groove 23 in which fits a mating radially extending circumferential ridge 24 of gasket 25 formed of resilient material such as rubber. Each gasket 25 thus may be readily snapped in place and removed, and is securely held in place while in its opening 22.

As shown in FIGURE 3, the rear portion 16 of conduit member 14 has an oblong cross sectional configuration that fits loosely in rear opening 12 of housing 1 and has on its exterior surface two oppositely radially-projecting longitudinally-extending ridges 26 that fit loosely in keyways 13 of opening 12 to act as keys preventing rotation or binding of member 14 in the rear wall of housing 1.

Near its front portion, but within housing 1, member 14 rigidly carries a radially extending collar 27 having a forwardly facing circular frusto-conical surface 28, the axis X—X of which is concentric with the axis of the oblong cross sectional rear portion 16 of member 14. This frusto-conical surface 28 is adapted to seat against a mating frusto-conical surface 29 on the inside of front way 6 of housing 1 when member 14 is in its extreme forward position. Collar 27 of the illustrated embodiment is separately formed and is located and locked against longitudinal movement on the exterior of member 14 between a shoulder 31 formed on radial portion 32 of member 14 and a retaining ring 33 snapped into a suitable groove in the portion 32. Member 14 is biased toward its extreme forward position in which its collar 27 seats against the front wall 6 of the housing 1, by a compression type spring 34 that surrounds the member 14 within housing 1 and bears against the housing rear wall 9 and against the collar 27. A rearwardly projecting shoulder 35 on the collar and a shoulder 36 on the rear wall serve to locate the spring transversely.

The front end portion 15 of member 14 includes a radially extending flange portion 37. This flange portion has a front face 38 that is normal to axis X—X. Resilient gasket 25 projects substantially from this front face 38 as shown in FIGURE 1. As is apparent from FIGURES 2, 4 and 5 several recesses 41 are formed in flange portion 37 inwardly from its front face 38; in the illustrated embodiment, there are eight such recesses 41, four being spaced at each side of the central openings 22 in the front of member 14 along a circular arc, both of which arcs are symmetrical about axis X—X. Each of these recesses 41 contains an insulating liner member 42, preferably formed of molded phenolic resin material, that has therein a recess 43 that is circular about an axis extending parallel to the axis X—X of the member 14. Each insulating member 42 is held in place in the flange portion 37 by retaining ring 44 that is snapped into a suitable groove in flange 37 near the front of the recess 41.

Each insulating member 42 resiliently carries an electrical contact member 45 which, as shown, comprises a cylindrical head portion 46 fixed to a rearwardly extending shaft 47. Head portion 46 is slidably mounted in the recess 43 of an insulating member 42, while shaft 47 is slidably mounted in an opening 48 in the rear of the insulating member 42 and extends through a larger clearance opening 49 at flange portion 37. A compression type spring 51 is located around shaft 47 of contact member 45, bearing against the rear of its head portion 46 and the bottom of recess 43 to bias the electrical contact member forwardly so its front protrudes substantially beyond the front face 38 of flange portion 37. This protruding front surface is flat for good electrical contact but has bevelled or rounded edges to prevent binding of the member in its recess with its mating member. The forward limit of travel of each contact member 45 is established by an insulating washer 52 that bears against the rear of the flange portion 37 and is located on the shaft 47 by a nut 53 which, together with a nut 54, clamps therebetween a terminal 55 of an insulated electrical conductor 56 forming part of the circuit means which is to be connected by the connector. As shown in FIGURES 3 and 5, these conductors are assembled in cables 57 that are supported at the central portions of the sides of the member 14 and extend out of the rear opening 12 of the housing 1; these side portions are longitudinally recessed or grooved as shown at 62 in FIGURES 3 and 5 to provide room for the cables 57 and reduce weight of metal in member 14.

At its outer periphery, which is preferably circular about the axis X—X of the member 14, the flange portion 37 at the front of the member 14 has three radially and forwardly extending lugs 58 (FIGURES 1, 2 and 5) that are equidistantly and equiangularly spaced about the axis X—X. Each of these lugs has an inwardly facing surface 59, all of these surfaces being equidistant from the axis X—X; each lug also has an outwardly flaring, inclined surface 60 extending from its outer edge to the inner surface 59 as shown. The periphery of the flange portion 37 also has three axially-extending generally flat land surfaces 61 that are equidistantly and equiangularly spaced around the axis X—X of member 14 and spaced equidistantly between the lugs 58 between which they are located. These land surfaces 61 are adapted to mate with and engage the inwardly facing surfaces 59 of the lugs of an identical connector to which the illustrated connector is connected, as is shown in FIGURE 5 of the drawings.

The operation of the connector illustrated in FIGURES 1-4, inclusive, can be understood by reference to FIGURES 5 and 6. FIGURE 6 diagrammatically shows two knuckle-type A.A.R. Type F couplers, A and B, in their final coupling movements. Each of these couplers carries below it one of the connectors C embodying the invention, mounted so that the axis X—X of the movable member 14 of the connector extends substantially parallel to the general direction of final coupling movement of the coupler with which it is associated when the member 14 is at its extreme forward location in the housing 1; in this case each connector C is mounted so its axis X—X extends parallel to the axis of the coupler and hence essentially parallel to the pulling axes of the couplers when they are coupled and under tension. The connectors C are also mounted on their respective couplers so that when the coupler is uncoupled the flange portions 37 of their members 14 normally extend a substantial distance forwardly of the coupling plane of the coupler, which plane is essentially normal to the pulling axes, so the flange portions 37 of the facing connectors first engage while the couplers are at a substantial distance away from final coupling while in their final coupling movements. As the couplers complete their coupling movements, the projecting lugs 58 of each of the flange portions 37, through contact of their inclined surfaces 60 with the flange portion 37 of the other connector C, guide both movable members 14 so that the inner surface 59 of each lug 58 is accurately located against and bears against the land surface portion 61 of the other flange, as shown in FIGURE 5.

This gathering action is facilitated because, during such action, the members 14 are pushed rearwardly into their respective housing members 1 as shown in FIGURE 5 so that the surfaces 28 of their collars 27 no longer seat against the frusto-conical seat portions 29 of the front walls 8 of the housings; and the front end portions of members 14, therefore, can move laterally as required to facilitate the accurate, firm engagement of the flange members 37; such lateral movement is also made possible by the loose fit of the rear portion 16 of the member 14 in the rear opening 12 of the housing 1. This accurate engagement and interfitting of the flange portions 37 result in firm sealing engagement of the outer surfaces of the gasket members 25 of the movable members 14, and the firm electrical contact engagement of the outer surfaces of the contact members 45, as shown in FIGURE 5, to provide the desired sealed passage for fluid and electrically conductive paths for electrical currents so long as the couplers are coupled together.

The connector illustrated in FIGURES 1 to 3, inclusive, also operates equally well with other types of couplers in which the final coupling movement is such that the connector cannot be mounted with its axis X—X parallel to the pulling axis of the coupler. FIGURE 7 diagrammatically shows two fixed jaw Willison type couplers D and E in their final coupling movement. Each of these couplers carries below it a connector C embodying the invention so that the axis X—X of the movable member 14 of the connector is disposed angularly to the axis of the coupler and, hence, angularly to the pulling axis of the couplers when they are under tension, although the axis X—X is in a generally horizontal plane essentially parallel to the axis of the coupler and to the pulling axis of the couplers when they are under tension. This angular mounting of each connector C is required because the final coupling movements of couplers of this type involve substantial lateral movements. Consequently, if the axis X—X of the member 14 of each connector C is mounted, as is preferable, so it extends substantially parallel to the direction of the final coupling movement of the coupler and so its extended flange portion engages before complete coupling of the couplers, it is at a substantial angle to the axis of the coupler and of the pulling axis. Apart from these angular dispositions of the connectors C with respect to the couplers on which they are mounted, the initial engaging action of the connectors C, and the final engagement of the connectors and the sealing of the gaskets 25 and electrical contact of the contact members 45 is essentially the same as that described above in connection with the knuckle-type couplers of FIGURE 6.

Unless preventive measures are taken, there possibly could be such misalignment of two opposing connectors as to cause one of the lugs 58 of one connector to impinge on the front face 38 of the flange portion 37 of the other connector. If the member 14 has too much freedom to move laterally of the longitudinal axis of the housing 1, the impinging lug will tend to remain engaged through failure to overcome frictional resistance offered by the face of the other connector, and hence will not enter into the desired centered relation with the other connector so that the two connectors are properly coaxially aligned.

This difficulty is overcome in the illustrated connector C by limiting the range of lateral movement of each member 14 relative to its housing 1 so that as two interlocking type couplers carrying the connectors move into coupled position, a connector C so misaligned with respect to another connector as to have one of its lugs 58 engaging the face 38 of the other connector, will be forced to move across the face of the other conector until the impinging lug 58 moves into gathering relation with its mating land surface 61 of the other connector. The lugs and land surfaces of the opposing connectors then enter into normal gathering relationship by virtue of the inner tapered faces 60 of the lugs.

In the apparatus of FIGURES 1-5, inclusive, when member 14 is in its retracted position, its lateral or wobble movement relative to the housing 1 limited by constructing the circular inner surface 65 of the cavity 5 of housing 1 and the circular peripheral surface 66 of the collar 27 of member 14 to relative diameters that provide a clearance 67 of uniform magnitude and special utility when the member 14 is in its forward position in which it is centered with respect to the housing. The clearance 67 also is of a minimum magnitude suitable to permit lateral movement of each retracted member 14 necessary to accommodate movements of coupled couplers relative to the housings 1, without causing engagement of the collar 27 with housing 1. Such engagement, if it should occur, could cause destructive forces on the connectors. The diameters of surfaces 65 and 66 are selected, however, so as to impose on the clearance 67 during coupling of uncoupled couplers a maximum limit such that the retracted movable members 14 of opposed connectors are caused to be forced or carried into positions of less misalignment and within the gathering ranges of the respective lugs 58 of the members 14 of the connectors.

By another arrangement, as shown in FIGURE 8, a modified movable member 14A, analogous to member 14, is provided with a forwardly extended shoulder 71 having a circular periphery 72 that can engage the inner peripheral surface 73 of circular opening 8 in the front wall member 6 to limit lateral movement in all directions of the front portion of the movable member, even when it is in its extreme retracted position. All other portions of the connector may be the same as described in connection with the preceding embodiment. This lateral movement limiting feature completely prevents the difficulties outlined above as arising from excessive lateral movement of the front portion of the movable member during coupling, while permitting the member 14A to move laterally and longitudinally relative to the housing 1 sufficiently to compensate for relative lateral and longitudinal movements of the connector housings 1 that are fixed to coupled couplers that move laterally and longitudinally in use.

While connectors embodying the invention may be employed on other types of couplers than those indicated, they provide particular advantages when employed in connection with widely used couplers that have substantial longitudinal, lateral and angling movements when in use, because the features described above permit the movable members 14 or 14A to be accurately located with respect to their housing members until the flange portions 37 on the front end portions of movable members of opposing connectors engage, after which the movable members are pushed backward into their housing to positions where the members can properly adjust laterally relative to each other independently of their housings to positions where leakproof sealing engagement can occur between the gaskets 25 and firm electrical contacts can be made between the electrical contact members. The members 14 or 14A are also laterally movable, as well as longitudinally movable, in their housings during operation of the train, and hence can accommodate themselves to relative motions of the couplers, whether these motions be longitudinal, lateral, or angling, to maintain such sealing engagement and electrical contacts.

The springs 34 in the housings 1 urging movable members 14 or 14A together are of such strength and size that they maintain the flange portions 37 of the connectors C in the proper connecting positions relative to each other despite substantial movement of the couplers and despite the pressure of the fluid in the movable members, while the size and strength of each of springs 52 urging the electrical contact members 45 toward each other are such as to maintain the contact members in good electrical contact when the flange portions 37 are properly located relatively to each other.

It is apparent that the construction of each of the illustrated connectors C is such that the parts can be readily assembled together, readily mounted on a coupler, and readily disassembled for inspection, cleaning or repair if required.

Assembly of either illustrated connector, as well as disassembly, if desired, is facilitated by the front wall member 6 of the housing. This wall member is internally shouldered as shown to fit accurately into the open end of cavity 5 of housing 1 to locate the wall member firmly against lateral movement in any direction relative to the housing 1. The wall member is axially clamped against the front end of the body of the housing 1 by the bolts 7. In assembly it is a simple matter to insert the bolts 7 through the appropriate holes in the wall member 6 and the housing body and draw up on their nuts to clamp the wall member rigidly in place, this even though the spring 34 is exerting force during the assembly. Similar advantages are provided in disassembly. The frustoconical seating surface 29 is formed on the shoulder portion of wall member 26; this facilitates manufacture, as well as inspection on disassembly.

The compact design of the connectors minimizes possibility of the connector striking or being struck by parts of cars or the track system. The illustrated connectors are of such strong construction that they will withstand the shocks and impacts of connecting and disconnecting while coupling and uncoupling occurs, as well as the shocks and wear incident to over-the-rail service.

It is intended that the patent shall cover, by suitable expression in the appended claims, whatever features of patentable novelty reside in the invention. The terms and expressions which have been employed are used as terms of description and not of limitation, and there is no intention of excluding such equivalents of the invention described or of portions thereof as fall within the purview of the claims.

What is claimed is:

1. For mounting on a railway vehicle coupler having a coupling end, a connector adapted to form with a like confronting cooperating connector on a coupled cooperating coupler a connection for fluid, said connector comprising a housing adapted to be rigidly mounted on said coupler and having a front end extending in the same direction as said coupling end of said coupler, an elongated movable member non-rotatably mounted in said housing for movement between an extreme front position and a rearward retracted position so that it is capable of lateral movement relative to said housing when it is in a retracted position, said movable member having a front portion extending from the front end of said housing and a rear portion extending from the rear of said housing and also having a fluid conduit passage extending from said rear portion to an opening in the front end of said front portion, means for biasing said movable member for movement toward its extreme front position in said houisng, means operating between said housing and said movable member for locating said front portion of said movable member accurately relatively to said housing when said movable member is in its extreme front position but permitting lateral movement of the front portion of said movable member when it is in a retracted position, transversely-extending flange means carried by the front portion of said movable member outside housing, aligning means on said transversely-extending flange means of said movable member for engaging like aligning means on transversely-extending flange means of a movable member of a like confronting cooperating connector carried by a cooperating coupler to align said movable members as they engage and retract on coupling of said couplers, means operating between said housing and said movable member for limiting to a predetermined amount lateral movement of said front portion of said movable member relative to said housing, sealing means at the front opening of said movable member, electrical contact means carried by said transversely-extending flange means and adapted to make electrical contact with electrical contact means on the trnsversely-extending flange means of a confronting cooperating connector, and elongated electrical conductor means connected to said electrical contact means and supported by said movable member, said elongated electrical conductor means extending from the rear of said transversely-extending flange means on the front portion of said movable member through said housing and to the rear portion of said movable member and out of said housing at the rear end thereof.

2. The connector of claim 1 comprising a plurality of fluid conduit passages, each of which extends through said movable member from said rear portion of said movable member to an opening in the front end of said movable member, said openings being located in a generally elongated area located generally centrally of the cross section of said flange means, said connector comprising a plurality of said electrical contact means that are located on said flange means at each side of said area in which are located said openings.

3. The connector of claim 2 in which the portion of said movable member containing said conduit passages is shaped throughout a major portion of its length extending through said housing to have a plurality of grooves each outside two adjacent conduit passages, in which grooves are disposed a plurality of said elongated electrical conduit means supported by said movable member.

4. The connector of claim 1 comprising a plurality of recesses in the front portion of said transversely-extending flange means, electrical insulating means mounted on each of said recesses, each of said electrical insulating means having a recess therein, electrical contact means supported in the recess of each of said electrical insulating means for movement in a path generally parallel to the path of forward and rearward movement of said movable member, and means biasing each of said electrical contact means toward the front of said movable member so said contact means projects from the front face of said movable member, said electrical contact means being connected to said electrical conductor means.

5. The connector of claim 1 in which said aligning means on said transversely-extending flange means includes a plurality of equidistantly and equiangularly spaced rigid locating lugs rigidly fixed to and projecting radially and forwardly from said transversely-extending flange means, and a plurality of equidistantly and equiangularly spaced surfaces fixed on said transversely-extending flange means and located between and equidistantly from said locating lugs and adapted to engage with similar locating lugs on a cooperating connector.

6. For mounting on a railway vehicle coupler having a coupling end, a connector adapted to form with a like confronting cooperating connector on a coupled cooperating coupler a connection for fluid, said connector comprising a housing adapted to be rigidly mounted on said coupler and having a front end extending in the same direction as said coupler end of said coupler, an elongated movable member non-rotatably mounted on said housing for movement between an extreme front position and a rearward retracted position so that it is capable of lateral movement relative to said housing when it is in a retracted position, said movable member having a front portion extending from the front end of said housing and a rear portion extending from the rear of said housing and also having a fluid conduit passage extending from said rear portion to an opening in the front end of said front portion, means for biasing said movable member for movement toward its extreme front postion in said housing, means rigidly fixed to said movable member extending radially thereof within said housing and carrying guide means and limitiing lateral movement of said front portion of said movable member by engagement with the interior of said housing when said movable member is retracted, means at the front portion of said housing adapted to engage said guide means on said movable member to locate said front portion of said movable member accurately relatively to said housing when said movable member is in its extreme forward position but permitting lateral movement of the front portion of said movable member when it is in a retracted position, means for supporting the rear portion of said movable member in said houiusing so that it is capable of limited lateral movement relative to said housing when said movable member is retracted, transversely-extending flange means carried by the front portion of said movable member outside said housing, aligning means on said transversely-extending flange means of said movable member for engaging like aligning means on transversely-extending flange means of a movable member of a like confronting cooperating connector carried by a cooperating coupler to align said movable members together as they retract on coupling of said couplers, the lateral movement of the front portion of said movable member permitted between said radial means carried by said movable member inside said housing and said housing being large enough to permit lateral movement of the front portions of said movable members to compensate for normal later movement of the couplers to which said connectors are attached during travel of the vehicles carrying the couplers, but said lateral movement being small enough to prevent sufficient misalignment of said aligning means to prevent connection of confronting cooperating connectors during final coupling movement of the couplers carrying said connectors.

7. The connector of claim 6 comprising electrical contact means carried by said transversely-extending flange means of said connector and adapted to make electrical contact with electrical contact means on the transversely-extending flange means of a confronting cooperating connector, and elongated electrical conductor means connected to said electrical contact means and supported by said elongated movable member, said elongated electrical conductor means extending from the rear of said transversely-extending flange means through said housing and through said radial means on said movable member to the rear portion of said movable member and out of said housing.

8. The connector of claim 6 comprising a plurality of fluid conduit passages each of which extends through said movable member from said rear portion of said movable member to an opening in the front end of said movable member, the portion of said movable member containing said conduit passages being shaped throughout a major portion of its length to have portions of elongated cross section that extend through said housing on either side of said radial means.

References Cited by the Examiner
UNITED STATES PATENTS

| | | | |
|---|---|---|---|
| 966,393 | 8/1910 | Foster | 285—63 |
| 1,005,092 | 10/1911 | Williamson | 285—63 |
| 1,856,656 | 5/1932 | Robinson | 285—63 |
| 2,062,740 | 12/1936 | Cartier | 213—76 |

ARTHUR L. LA POINT, *Primary Examiner.*

B. FAUST, *Assistant Examiner.*